United States Patent
Ansari et al.

(10) Patent No.: US 8,321,296 B2
(45) Date of Patent: Nov. 27, 2012

(54) METHODS AND SYSTEMS FOR DISTRIBUTING SOLAR ENERGY CHARGING CAPACITY TO A PLURALITY OF ELECTRIC VEHICLES

(75) Inventors: Adil Ansari, Kennesaw, GA (US); Kenneth James Caird, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 13/082,448

(22) Filed: Apr. 8, 2011

(65) Prior Publication Data

US 2012/0259723 A1 Oct. 11, 2012

(51) Int. Cl.
*G06Q 30/00* (2006.01)
(52) U.S. Cl. ........ 705/26.3; 700/286; 700/291; 700/295
(58) Field of Classification Search .................. 700/286, 700/291, 295; 705/26.3
See application file for complete search history.

(56) References Cited

U.S. PATENT DOCUMENTS

| | | | |
|---|---|---|---|
| 7,635,810 B2 | 12/2009 | Luch | |
| 7,693,609 B2 * | 4/2010 | Kressner et al. | 700/291 |
| 2010/0082464 A1 * | 4/2010 | Keefe | 705/32 |
| 2010/0094476 A1 * | 4/2010 | Hamilton et al. | 700/295 |

OTHER PUBLICATIONS

Ramsey, Mike, "Corporate News: GE, Siemens to challenge start-ups—Both companies plan to release their own line of electric-car charging stations, entering emerging business", The Wall Street Journal Asia. Hong Kong: Feb. 25, 2011. p. 19.*
Sortomme, Eric, "Optimal Aggregator Bidding Strategies for Vehicle-to-Grid" University of Washington, 132 pages; AAT 3472313.*
Rulison, Larry, "Governor's mansion makeover powers up; Solar-electric system bids are sought as part of Spitzer's green vision", Times Union. Albany, N.Y.: Sep. 18, 2007. p. C.1.*

* cited by examiner

*Primary Examiner* — Mark Fadok
(74) *Attorney, Agent, or Firm* — Mark E. Henderson; Ernest G. Cusick; Frank A. Landgraff (57) ABSTRACT

A method of distributing charge capacity to electric vehicles in a charging system that includes a solar charge capacity generated locally. The method may include: determining a requested charge for the plurality of electric vehicles, calculating a requested charge time, the solar charge capacity comprising the total charging capacity of the charging system via solar generated energy; calculating a charge time capacity, the charge time capacity comprising the available charge time of the charging system; comparing the requested charge to the solar charge capacity; comparing the requested charge time to the charge time capacity; and if it is determined that either the requested charge is greater than the solar charge capacity or the requested charge time is greater than the charge time capacity, auctioning the solar charge capacity to operators of the plurality of electric vehicles.

22 Claims, 4 Drawing Sheets

Figure 4

METHODS AND SYSTEMS FOR DISTRIBUTING SOLAR ENERGY CHARGING CAPACITY TO A PLURALITY OF ELECTRIC VEHICLES

BACKGROUND OF THE INVENTION

This present application, in general, includes methods, systems and apparatus relating to the charging of electric vehicles. More specifically, but not by way of limitation, the present application relates to methods, systems and apparatus relating to the optimized charging of electric vehicles from a solar energy source.

Electric vehicles are increasing in number as more environmentally conscious transportation alternatives are sought. In the near future, many persons will drive electric vehicles to work. However, current distribution networks are not designed for concentrated charging of a large number of electric vehicles. Local generation from solar panels or solar thermal generators may provide the extra charging capacity that could alleviate this problem. However, typically, there is not enough roof top area on offices and parking garages for solar panels to charge all employees electric vehicles at the same time.

Because of this, systems and methods for optimizing a charging process that utilizes charge capacity from local generated solar power and/or the grid would find demand in the marketplace. Under such a solution, for example, the efficient usage of clean energy could be furthered, the optimized number of vehicles could be charged, and income generated from this service could be maximized.

BRIEF DESCRIPTION OF THE INVENTION

The present application thus describes methods of distributing charge capacity to a plurality of electric vehicles in a charging system that comprising a solar charge capacity generated locally from solar energy. In certain embodiments, the method includes the steps of: determining a requested charge for the plurality of electric vehicles, the requested charge comprising the total energy required to charge the batteries of the plurality of electric vehicles from a current state-of-charge to a desired state-of-charge; calculating a requested charge time, the requested charge time comprising the total charging time required to charge the batteries of the plurality of electric vehicles from the current state-of-charge to the desired state-of-charge; calculating the solar charge capacity, the solar charge capacity comprising the total charging capacity of the charging system via solar generated energy; calculating a charge time capacity, the charge time capacity comprising the available charge time of the charging system; comparing the requested charge to the solar charge capacity; comparing the requested charge time to the charge time capacity; and if it is determined that either the requested charge is greater than the solar charge capacity or the requested charge time is greater than the charge time capacity, auctioning the solar charge capacity to operators of the plurality of electric vehicles.

The present application further includes a system for distributing battery charge capacity to a plurality of electric vehicles. In exemplary embodiments, the system includes: means for generating solar energy locally; means for locally storing the locally generated solar energy; a plurality of charging stations for charging the batteries of the electric vehicles; and a computer-implemented control unit. The control unit may be configured to: group a plurality of electric vehicles into an auction group based on a predetermined criterion; determine a requested charge for the auction group, the requested charge comprising the total energy required to charge the batteries of the electric vehicles of the auction group from a current state-of-charge to a desired state-of-charge; calculate a requested charge time, the requested charge time comprising the total charging time required to charge the batteries of the electric vehicles of the auction group from the current state-of-charge to the desired state-of-charge: calculate the solar charge capacity, the solar charge capacity comprising the total charging capacity of the charging system via the locally generated solar energy; calculate a charge time capacity, the charge time capacity comprising the available charge time of the charging system; comparing the requested charge to the solar charge capacity; comparing the requested charge time to the charge time capacity; and if a capacity shortage is determined via a finding that the requested charge is greater than the solar charge capacity or the requested charge time is greater than the charge time capacity, auctioning the solar charge capacity to operators of the electric vehicles of the auction group.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
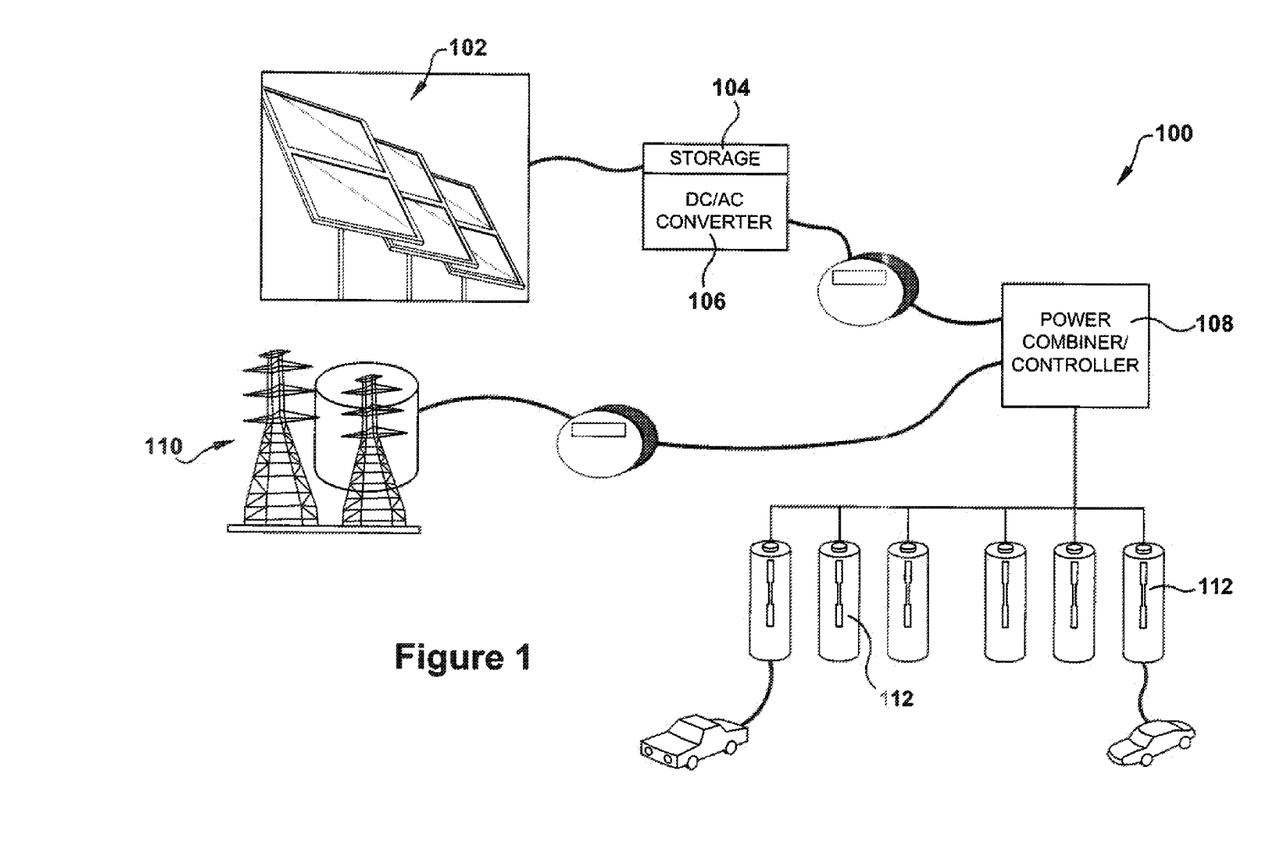
FIG. 1 is a schematic representation of an exemplary charging system according to certain aspects of embodiments of the present invention.

Referring to FIG. 1, a schematic representation of a charging system 100 according to an exemplary embodiment of the present invention is provided. The system 100 may include local solar panels 102 or other local systems for generating energy from solar energy, such as solar thermal heat engines. The system 100, as shown, may include storage 104, such as batteries or other conventional means, as well as a DC/AC converter 106. The power generated by the solar panels 102 may be routed into conventional electrical systems and apparatus, which is referred to herein as a power combiner/controller 108. The power combiner/controller 108 may also include an electrical power input from the grid 110, as shown. The power combiner/controller 108 then may provide electrical power to a plurality of charging stations 112 from the solar panels 102, the grid 110, or a combination of the solar panels 102 and the grid 110. The charging stations 112 may be configured to charge to electric vehicles, which, as used herein, may include electric vehicles, plug in hybrid electric vehicles, and other types of vehicle for which electric charging is needed.

Electric vehicles are every-increasing in number as a more environmental-friendly transportation alternative. In the near future, many people will drive electric vehicles to work. However, as mentioned, current distribution networks are not designed for concentrated charging of a large number of electric vehicles. Local generation from solar panels may provide the extra charging capacity that could alleviate this problem. However, typically, there is not enough rooftop area on offices and parking garages for solar panels to charge all employees electric vehicles at the same time.

Figure 2:
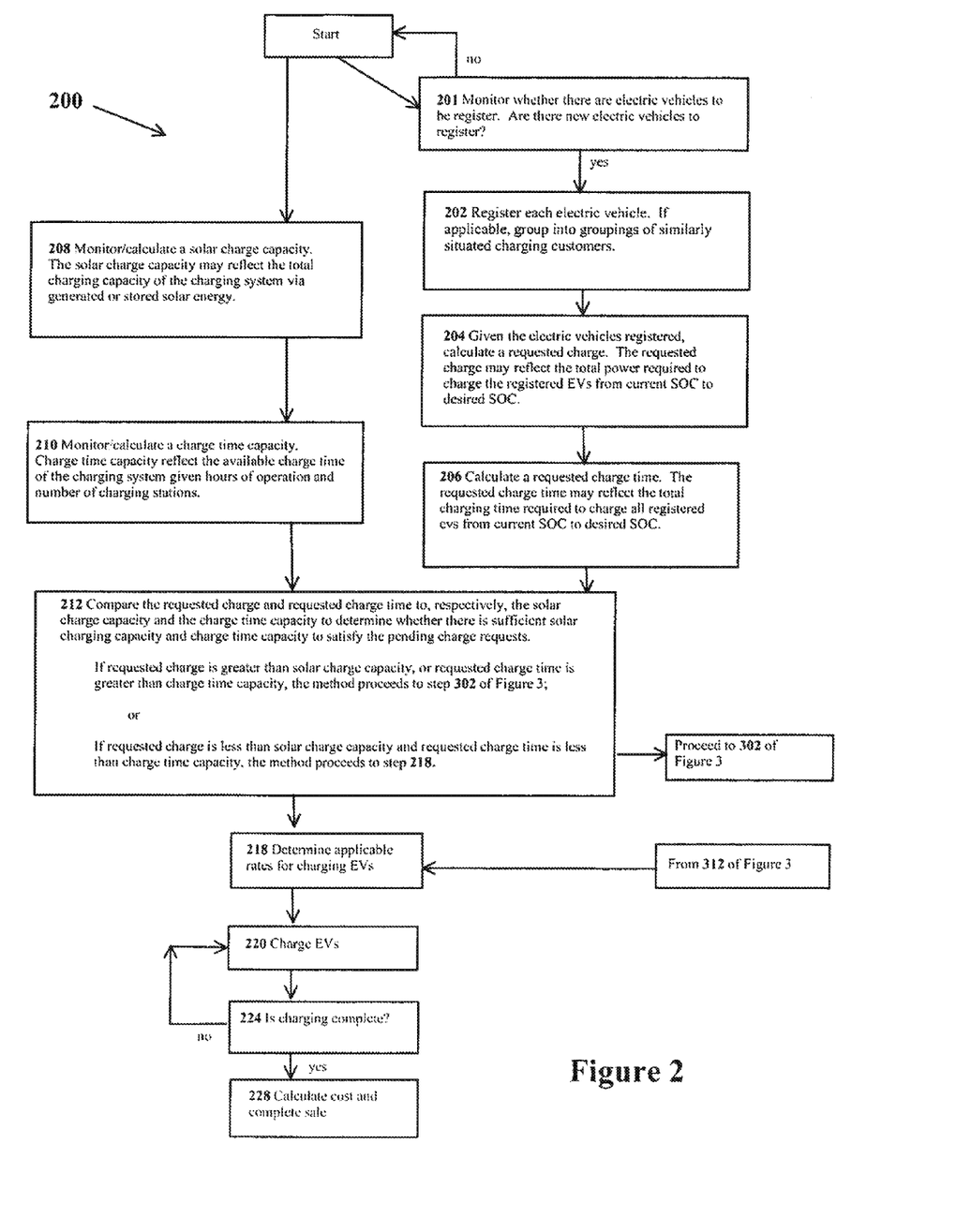
FIG. 2 is a flow diagram illustrating steps according to exemplary embodiments of the present invention.
Figure 3:
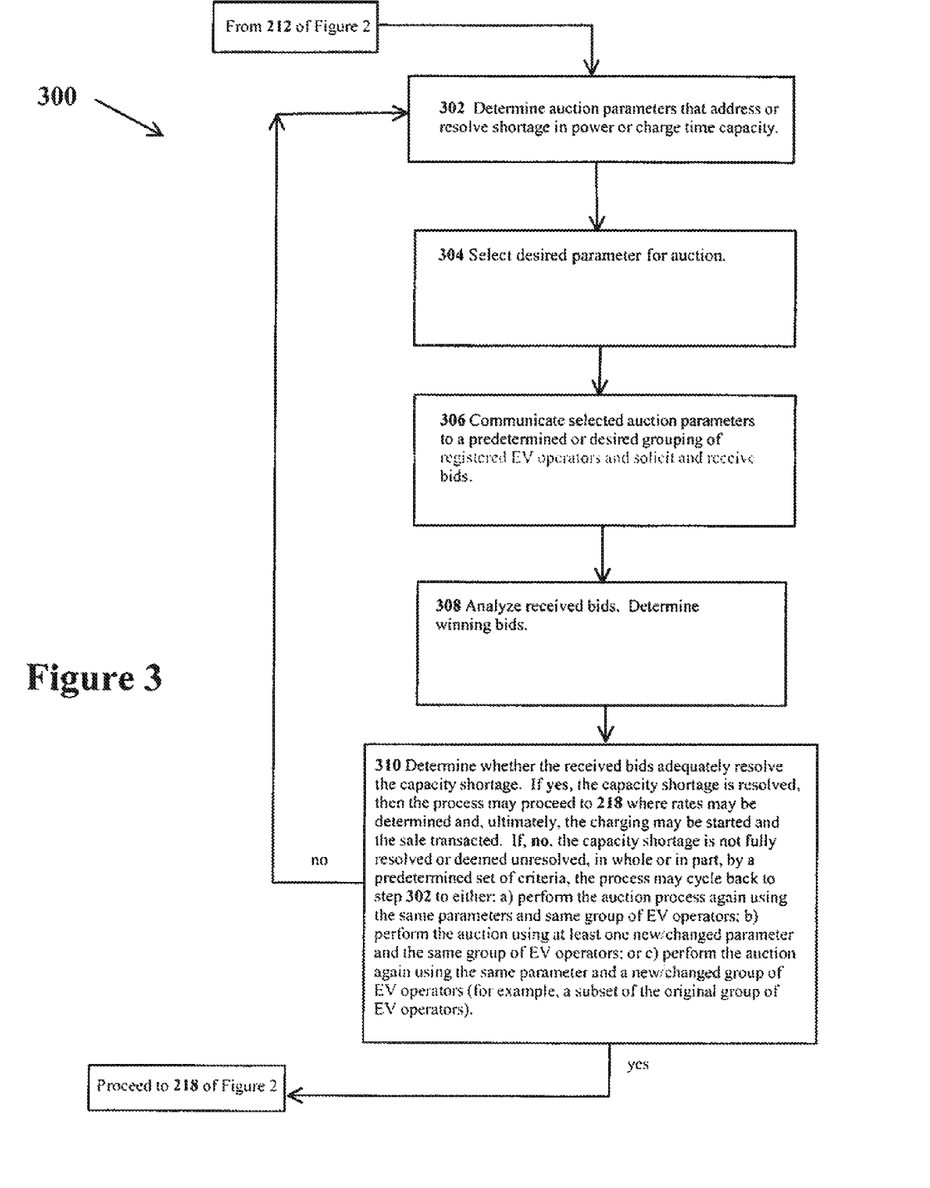
FIG. 3 is a flow diagram illustrating steps according to exemplary embodiments of the present invention.

Because of this, systems and methods for optimizing a charging process that utilizes both charge capacity from locally generated solar power and the grid are needed. Under such a solution, for example, the efficient usage of clean energy could be furthered, the number of vehicles charged could be optimized, and the income generated from providing this service could be maximized. Referring to FIGS. 2 and 3, one such system and method is illustrated. It will be appreciated by those of ordinary skill in the art that the process described in relation to FIGS. 2 and 3 is exemplary and, in providing an example as to one way in which the present invention may he implemented, includes both essential and non-essential steps. FIG. 2 includes a flow diagram of a charging control method 200, and FIG. 3 includes an auction method 300 that may he used as a sub-process within the charging control method 200.

Those of ordinary skill in the art will appreciate that algorithms, control programs, logic flow diagrams, and/or software programs, as described in detail below, may be developed to monitor, perform and manage the methods, processes, and sub-processes described herein. Such a system may include multiple sensors that monitor the relevant operational variables. These hardware devices and systems may send data and information to and be controlled and manipulated by a conventional, computer implemented operating system. That is, pursuant to conventional means and methods, an operating system may acquire data from the system, process the data, communicate with the operators of the system, and/or control the various mechanical and electrical devices of the system pursuant to a set of instructions or logic flow diagram, which, as one of ordinary skill in the art will appreciate, may be made part of a software program.

FIGS. 2 and 3 illustrate logic flow diagrams, which may be used in a software program to implement certain aspects of the present invention. As one of ordinary skill in the art will appreciate, the logic flow diagrams may be implemented and performed by an operating system. In some embodiments, the operating system may comprise any appropriate high-powered solid-state switching device. The operating system may be a computer; however, this is merely exemplary of an appropriate high-powered control system, which is within the scope of the application. The operating system also may be implemented as a single special purpose integrated circuit, having a main or central processor section for overall, system-level control, and separate sections dedicated performing various different specific combinations, functions and other processes under control of the central processor section. It will be appreciated by those skilled in the art that the operating system also may be implemented using a variety of separate dedicated or programmable integrated or other electronic circuits or devices, such as hardwired electronic or logic circuits including discrete element circuits or programmable logic devices or the like. The operating system also may he implemented using a suitably programmed general-purpose computer, such as a microprocessor or microcontroller, or other processor device, such as a CPU or MPU, either alone or in conjunction with one or more peripheral data and signal processing devices. in general, any device or similar devices on which a finite state machine capable of implementing the logic flow diagrams may be used as the operating system.

Referring specifically to FIG. 2, at a first step 201, the charging, system 100 may monitor whether there are electric vehicles that need to be registered. This step may be performed via conventional means and methods relating to monitoring a place of business and alerting an attendant, whether automated or otherwise, if a customer requires assistance. If "no" electric vehicle requires registration, the system may cycle back to the start of the process such that it keeps monitoring for the arrival of electric vehicles. If "yes" there are electric vehicles that require registration the system may proceed to step 202, as indicated. Note that certain steps in the process may be continually performed even as the process proceeds to a subsequent step. Step 201 may be configured to perform as one of these types of steps, as the system may continually monitors whether additional electric vehicles have arrived: In this case, for each arriving electric vehicle, the method 200 may continue to the subsequent steps shown, while also monitoring for other arriving vehicles.

At a step 202, the charging system 100 may register the arriving electric vehicles (i.e., those electric vehicles that need a charge by the system 100). This step may include requesting and recording various types of relevant information as necessary for the following steps that are described more fully below. Accordingly, it will be appreciated that this may include acquiring and recording some or all of the following types of information: the owner/operator of the electric vehicle (hereinafter "electric vehicle operator" or "operator"), the type of electric vehicle, the battery type and model that requires charging, payment information (for example, a credit card of the electric vehicle operator), a history of battery usage, including previous charging events at the charging system 100, a current state of charge (also referred to herein as "current SOC"), which represents the current charge or pre-charging state of the electric vehicle battery, and a desired state of charge (also referred to herein as "desired SOC"), which represents a desired charge or desired charge level after the electric vehicle is charged by the system 100. It will be appreciated that electric vehicle operators may preregister much of the relevant information via electronic registration, that much of the information may be retrieved from a central database that was recorded at a prior visit or otherwise, or that all of the registration information may be gathered at the actual time the charging is requested. In addition, as explained in detail below, those electric vehicles registering may be grouped within an auction group. An auction group may include electric vehicles that registered within a certain predetermined window of time or be otherwise similarly situated such that, as provided below, the electric vehicle operators of this group may bid against each other such that a charging capacity shortfall is resolved.

Also, registration may include information regarding the near term availability of the electric vehicle for charging, which may also be referred to as "electric vehicle availability". This information may include time limitations as to when the electric vehicle is available for the charging and/or any operator specified deadlines as to when the charging needs to be completed). In some embodiments, operators who provide greater availability for charging of the electric vehicle may receive lower charge prices, as the operators vehicle may be charged during periods of low demand. Also, operators who need an immediate charge may be required to pay additional fees during periods of high demand. During the registration process, the electric vehicle operator may provide contact information (for example, email, texting or phone information) so that the operator of the charging system 100

(or "system operator") may contact the electric vehicle operator regarding moving his/her electric vehicle into the charging station so that it may be connected and begin charging. Also, the contact information may be provided so that the operator of the electric vehicle may be contact and submit bids should an auction be necessary, as provided below. In other embodiments, an attendant of the charging system 100 may collect the keys from the electric vehicle operators during the registrations process so that the attendant may move each car in and out of the charging station as necessary.

In some embodiments, the desired SOC may be chosen by each electric vehicle operator. In other embodiments, the operator of the system 100 may define rules that limit the alternatives from which the electric vehicle operator may choose. For example, the operator of the system 100 (or "system operator") may set a maximum charge level that limits the extent to which the battery of each electric vehicle may be charged. In this case, for example, the maximum charge level may be set at a level such that the charging system 100 may charge a greater number of cars to a level that is less than a full charge level instead of charging fewer cars to a full charge level. In one exemplary embodiment, for instance, the maximum charge level value of 80% may be used. Further, in some embodiments of this type, electric vehicle operators may opt to pay a premium to have their car charged beyond the maximum charge level. In some embodiments, the premium may correspond to the cost of drawing power from the grid, as explained in more detail below.

At a step 204, given the registration information recorded at step 202 and other relevant information, the system 100 may calculate the requested charge for the registered electric vehicles. It will be appreciated that the requested charge may include the total power required to charge all registered electric vehicles from current SOC to desired SOC.

At a step 206, given the registration information recorded at step 202 and other relevant information, the charging system 100 may calculate the requested charge time. It will be appreciated that the requested charge time may be determined by calculating the time to charge each electric vehicle given the current SOC, the desired SOC, and the charging properties associated with the particular battery type of the electric vehicle as well as the charging characteristics of the chargers being used by the particular charging station 112. Then, the total charge time required may be calculated or accurately estimated by summing the calculated charge times for each registered vehicle. In addition, given that the number of registered electric vehicles will often exceed the number of charging stations, the total required charging time should reflect whether the registered electric vehicles will be able to be charged concurrently or whether some electric vehicles will have to wait for a charging station to open.

Figure 4:
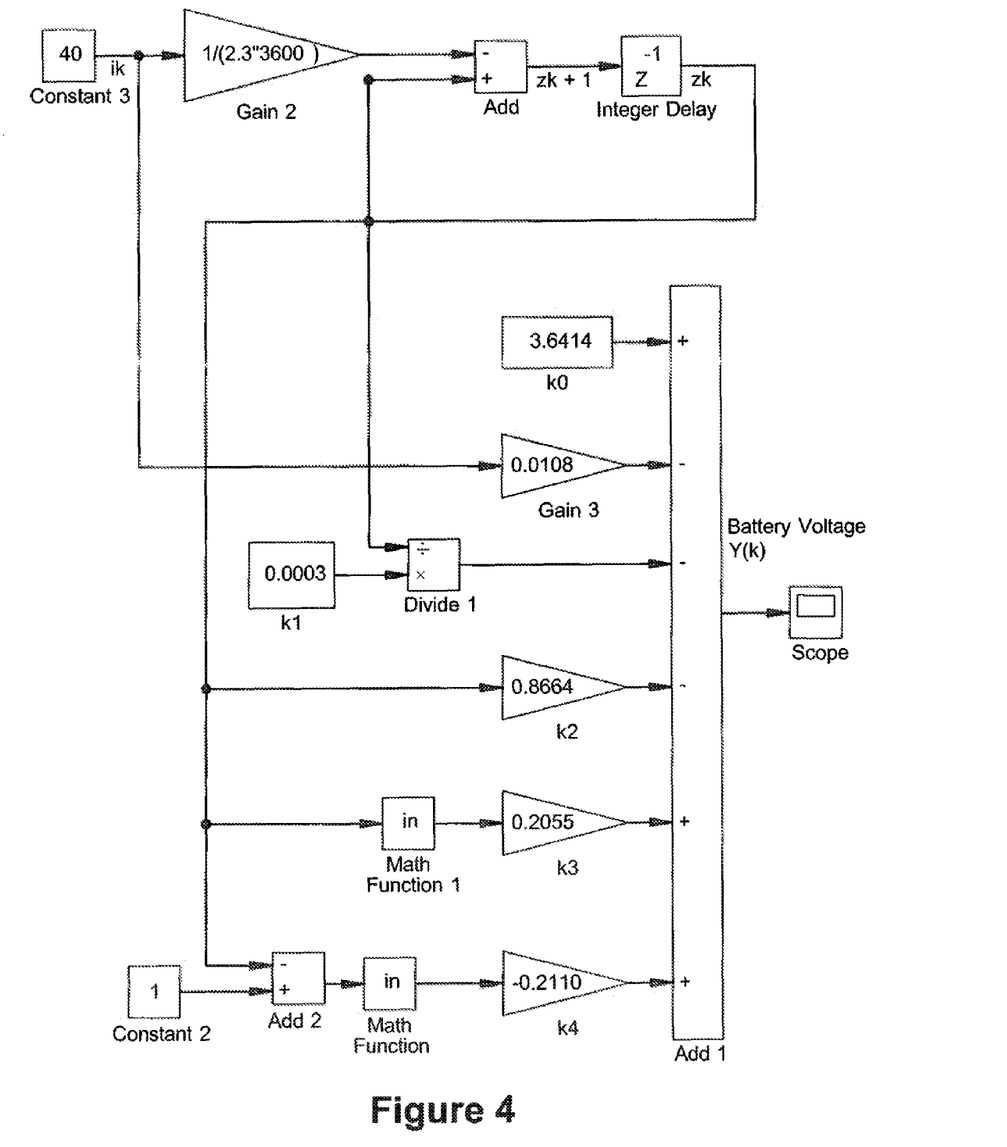
FIG. 4 is a schematic representation of an exemplary charging system according to certain aspects of embodiments of the present invention.

It will be appreciated that in determining the requested charge and the requested charge time, certain charging optimization strategies for charging the group of registered electric vehicles may be employed. In one preferred embodiment, it will be appreciated that the charging operation may be optimized or, at least, improved by using algorithms that promote effective/efficient charging operations. In this manner, the number of electric vehicles that may be charged at the available charging stations of a typical charging system may be maximized or, at least, increased, while the solar energy spent for the charging is minimized or, at least, used more efficiently. For example, the following describes an algorithm that may be used to optimize (or, at least, make more efficient according to certain criteria) vehicle charging operations. More specifically, it will be appreciated that the following algorithm may be used to maximize or increase the number of vehicles that the charging system 100 is able to service, while minimizing or decreasing the power drawn from the solar generated supply of energy such that it is used efficiently. FIG. 4 provides a schematic design of an electric vehicle charging system that may be employed for optimized or more efficient charging results. Those of ordinary skill in the art will appreciate that the present invention may employ other algorithms or charging optimization strategies and systems may be used.

First order state of charge (SOC) equation:

$$SOC(t) = SOC_0 + \frac{1}{Qbat}\int_{t0}^{t} ibat(t)dt \quad (1)$$

Written in discrete form:

$$Z_{k+1} = Z_k + \frac{ni\Delta t}{Qbat}ibat \quad (2)$$

$$Y_k = K_0 - R_{ik} - \frac{K1}{Z_k} - k2Z_k + K3\ln(Z_k) \quad (3)$$

$$\Delta t = \frac{(Z_{k+1} - Z_k)Qbat}{(ni \cdot ibat)} \quad (4)$$

Where:
SOC=Desired charge
$SOC_0$=Battery initial charge
Qbat=Battery Capacity (Ah)
Ibat=Battery charging constant current
$Z_k$=Current state of charge
$Z_{k+1}$=Next state of charge
K, K1 . . . K3=battery constants
ni=Battery efficiency
Δt=Charging time ($t_o$=start of charge time; t=end of charge time)
$Y_k$=Battery voltage at discrete time k
Steps:
1. Number of cars "n" that can be charged at time t may be calculated using:

$$n = \frac{I\max}{Ibatt/veh}$$

Where Imax=Maximum Charging Station current available
Ibatt/veh=current required by a battery per vehicle
2. Charging time Δt may be calculated using Equation 4.

Returning again to FIG. 2, from the start of the process, the method may also proceed in parallel to a step 208 where it calculates the solar charge capacity for the charging system 100. This determination may include calculating a present charging capacity based on the status of any local storage device or batteries 104 as well as the solar energy currently being generated. It will be appreciated that this determination may also include calculating the expected charging capacity of the charging system 100 in the near future or over a predetermined period of time (for example, over the next few hours, the remainder of the sunlight hours, the remaining hours in the business day, etc.) given the expected solar energy harvested over that time. It will be appreciated that accurate predictions of the expected solar energy generated on any particular day may be made pursuant to conventional methods that rely on such factors as historical climate data, seasonal variations, current and predicted climate conditions, historical solar energy generation records (i.e., the energy generated by similar solar panels during similar time periods), and other factors. In some embodiments, the solar charge capacity also may reflect any surplus charge capacity that the solar panels previous stored in the local storage device 104, which may occur if surplus energy is generated during a previous generating period. Thusly, the solar charge capacity may be calculated such the capacity of the local solar panels to deliver charge to the batteries of the electric vehicles over the course of a given time period may be accurately estimated.

At a step 210, a charge time capacity may be calculated. Total charge time capacity may include a calculation reflecting the charge time available at the several charging stations 112 of the charging system 100. In a simplified form, total charge time capacity may include multiplying the number of charging stations by the amount of time remaining in which the charging system 100 operates (i.e., allows customers to charge their electric vehicles). Thus, if there were ten charging stations and 2 hours of operation remaining for the charging system 100, there would be approximately 20 hours of total charge time capacity remaining in the day. It will be appreciated that in some instances, total charge time capacity may be reduced given operator specified charging deadlines, which are operator defined time periods in which the charging must be completed. For example, if the register electric vehicles all had a deadline of 2 hours to be charge, the effective charge time capacity would be two hours multiplied by the number of charging stations even if more than two hours remained in the hours of operation for the charging system 100. In addition, for greater accuracy, it will be appreciated that the calculation of charge time capacity may take into account set up time during which charging is not possible. For example, this may include the time in which it takes to connect/disconnect electric vehicles at each of the charging stations once charging is complete. Depending on how the charging stations 112 and electric vehicles are configured, this process could mean that the charging station 112 is off-line for approximately 5-10 minutes per hour to connect/disconnect electric vehicles. This downtime or wasted time, over time, may decrease as new technologies improve the ease at which electric vehicles are connected/disconnected to charging stations.

The charging system 100 may continually monitor operation criteria such that the solar charge capacity and charge time capacity are updated continually or, at least, periodically to reflect current charging capacity and charging station availability as conditions change, which may include changes to solar generating capabilities, changing weather conditions, actual charging results relating to the electric vehicles that are currently being charged or completing the charging process, and/or other such changing criteria.

At a step 212, the method may compare the requested charge and the requested charge time to, respectively, the solar charge capacity and the charge time capacity to determine whether there is sufficient solar charge capacity and charge time capacity to satisfy pending charge requests. As illustrated, if the requested charge is greater than solar charge capacity or requested charge time is greater than charge time capacity, then the process may proceed to a step 302 of the auction method of FIG. 3. More specifically, it will be appreciated that if either of these conditions are satisfied, the charging system 100 lacks capacity to service completely the pending requests of the registered electric vehicle operators, and, given this, the method proceeds to step 302 and the auction process of FIG. 3. If the requested charge is less than total solar charge capacity and requested charge time is less than total charge time capacity, the method may proceed to steps 218 through 228, as illustrated, where, as described in more detail below, the charging may begin and, ultimately, the sale transacted.

Referring now to FIG. 3, an exemplary auction process 300 according to an exemplary embodiment of the present invention is illustrated. At a step 302, the process may determine auction parameters that address or resolve shortages in solar charge capacity or charge time capacity that were identified within the function of the process of FIG. 2. As such, if the shortage involves a lack of solar power generated energy, the auction may involve parameters that relate to the cost of the solar power generated energy that is available. If, on the other hand, the shortage involves the lack of charging time capacity, the auction may involve parameters that relate to the cost of charging time (i.e., the amount of charging time purchased by each of the electric vehicle operators). For each type of shortage, it will be appreciated that several different types of auction parameters may applied that resolve the lack of capacity. For example, an auction related to the price that the electric vehicle operators are willing to pay could he used to resolve both a lack of solar charge capacity as well as a lack of charge time capacity. Similarly, an auction related to the purchase of charging time (i.e., a price that the electric vehicle operators are willing to pay for each minute/hour of charge time) could be used to resolve both a lack of solar charge capacity as well as a lack of charge time capacity. Though the present invention is not so limited, several auction parameters are provided below in accordance with several preferred embodiments of the present invention.

A first type of auction may include auctioning the available solar generated charging capacity to the highest bidders. In this example, all of the similarly situated electric vehicle operators (for example, electric vehicle operators who are grouped together because they registered at approximately the same time) would submit bids regarding the amount of money they would be willing to pay for the solar energy required to charge their electric vehicle. More specifically, the main auction parameter for this type of auction would be price per kilowatt-hour that the electric vehicle operator is willing to pay for the solar derived power.

A second type of auction may include auctioning the available charge time capacity to the highest bidders. In this example, all of the similarly situated electric vehicle operators would submit bids regarding the amount of money they would be willing to pay for a unit of charge time. More specifically, the main auction parameter for this type of action would be the price per minute of charge time.

A third type of auction may include auctioning a combined source of power that includes solar power (i.e., solar generating capacity) and power that is pulled from the grid. More specifically, in some embodiments, power may be pulled from the grid to augment power supply such that capacity issues are resolved. It will be appreciated that power from the grid may be used to increase the supply of power such that a shortage of solar charge capacity may be resolved. Also, in certain embodiments, power from the grid may be used to shorten the charge time of registered electric vehicles such that charge time capacity issues are resolved. Whatever the case, the similarly situated electric vehicle operators may hid on how much of a premium they are willing to pay over the usual price of the solar generated supply of power.

In one exemplary combined power source embodiment, the price of the power that is solar generated is less than the price of the power drawn from the grid. In this case, the electric vehicle operators generally will submit bids in a price range defined, on the lower end, by the price of the solar generated power and, on a higher end, the price of the power drawn from the grid. It will be appreciated that the closer the bids are to the price of the grid-power, the more likely it is that the bid will be successful. In this manner, the electric vehicle operators may compete for the right to purchase the cheaper energy from the renewable source (i.e., the solar energy), while the auction method provides an upward pressure on the final purchase price and results in a significant premium being paid to the system operator in comparison to the usual price charged for the solar generated energy. As discussed in more detail below, those electric vehicle operators who submit winning bids, then will have their electric vehicles charged with the solar generated power at the bid price they submitted, while, those electric vehicle operators who submitted unsuccessful bids, then either will have their electric vehicles charged with power drawn from the grid at usual grid prices (which, theoretically, should be at a higher rate than all of the winning bids), or, if not even the combined power supply (i.e., solar and grid derived power) is sufficient to charge all of the registered electric vehicles (which could be the situation when there is a shortage of charge time capacity), the remaining electric vehicle operators may have to bid for grid power at a cost above usual grid power rates. In this manner, the incentive to bid high in the initial round is increased and, in some cases, could result in bids for the solar generated energy that are higher than the price for grid energy.

At a step 304, a desired parameter for the auction is selected and, at a step 306, the auction parameters are communicated to the electric vehicle operators. This step may include soliciting and receiving bids from the electric vehicle operators. The bidding process may be implemented using conventional technology. For example, the bidding process may be implemented via computers, smart phones, and/or other computer implemented devices over a network such as the internet or satellite or cell phone networks, etc.

At a step 308, the bids that are received by the electric vehicle operators may be analyzed and the winning bids determined. The criteria for determining the winning bids may be bids that provide the highest price for either the solar generated energy, grid derived energy, charge time, etc.

At a step 310, the method may determine whether the winning bids adequately resolve the capacity shortage. That is, in certain scenarios, the winning bids may not fully resolve the capacity shortage if, for example, a number of the registered electric vehicle operators fail to submit bids or a number of electric vehicle operators submit the same bid price. If yes, the capacity shortage is resolved, then the process may proceed to 218 where rates may be determined and, ultimately, the charging may be started and the sale transacted. If, no, the capacity shortage is not fully resolved or deemed unresolved, in whole or in part, by a predetermined set of criteria, the process may cycle back to step 302 to either: a) perform the auction process again using the same parameters and same group of electric vehicle operators; b) perform the auction using at least one new/changed parameter and the same group of electric vehicle operators; or c) perform the auction again using the same parameters and a new/changed group of electric vehicle operators, which, for example, could be a subset of the original group of electric vehicle operators.

Referring again to FIG. 2, the process may continue to step 218 where the applicable charging costs are calculated for the electric vehicles that will be charged. The charging cost either will be calculated given the quoted rates that were provided upon registration of the electric vehicles or the results of the auction process of FIG. 3.

At step 220, the electric vehicles are connected to the charging stations and charged until the charging is determined to be complete at step 224. Upon completion, the process may then advance to step 228 where final costs may be calculated and the sale completed. It will be appreciated that this may be done per conventional means and methods.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method of distributing charge capacity to a plurality of electric vehicles in a charging system that includes a solar charge capacity that is generated locally from solar energy, the method comprising at least one processor executing instructions for performing the steps of:

determining a requested charge for the plurality of electric vehicles, the requested charge comprising the total energy required to charge the batteries of the plurality of electric vehicles from a current state-of-charge to a desired state-of-charge;

calculating a requested charge time, the requested charge time comprising the total charging time required to charge the batteries of the plurality of electric vehicles from the current state-of-charge to the desired state-of-charge;

calculating the solar charge capacity, the solar charge capacity comprising the total charging capacity of the charging system via the locally generated solar energy;

calculating a charge time capacity, the charge time capacity comprising the available charge time of the charging system;

comparing the requested charge to the solar charge capacity;

comparing the requested charge time to the charge time capacity; and when a capacity shortage is determined via a finding that the requested charge is greater than the solar charge capacity or the requested charge time is greater than the charge time capacity, auctioning the solar charge capacity to operators of the plurality of electric vehicles.

2. The method according to claim 1, further comprising the step of grouping the plurality of electric vehicles into an auction group based on a predetermined criterion;

wherein the step of auctioning the solar charge capacity comprises auctioning the solar charge capacity to the auction group.

3. The method according to claim 2, wherein the predetermined criterion by which the electric vehicles are grouped comprised the time at which the electric vehicles arrived at the charging system, wherein the electric vehicles are grouped within an auction group based upon whether each electric vehicle arrived at the charging system within a predetermined window of time; and wherein the charge time capacity calculation is based upon the hours of operation of the charging system, the number of charging stations at the charging system, and an availability for charging for each of the electric vehicles within the auction group.

4. The method according to claim 3, further comprising a step of registering each of the electric vehicles;

wherein, for each electric vehicle, registration includes collecting operator specified charging deadlines that indicate the time period in which the electric vehicle is available for charging; and wherein the charge time capacity calculation includes taking into account the operator specified charging deadlines.

5. The method according to claim 4, wherein the registration step includes collecting the following types of information for each of the electric vehicles in the auction group: a battery type used by the electric vehicle, charging characteristics for the battery type, payment information from the operator, the current state-of-charge, the desired state-of-charge, and communication information for the operator; and wherein the communication information includes at least a manner in which the operator may be contacted and a manner by which the operator plans to submit bids during the auctioning step.

6. The method according to claim 5, wherein the communication information includes at least one of an email address and a number to a smart phone.

7. The method according to claim 2, wherein the step of auctioning the solar charge capacity includes soliciting bids from each of the operators of the electric vehicles within the auction group; and wherein the bids relate to a price per unit of energy from the solar charge capacity.

8. The method according to claim 2, wherein a system operator for the charging system defines a maximum desired state-of-charge that is less than a full charge level for each battery to be charged.

9. The method according to claim 8, further comprising the steps of:

asking the operators of the electric vehicles if they want to pay an increased fee to exceed the maximum desired state-of-charge; and permitting only those operators who opt to pay this increased fee the ability to charge the battery of their electric vehicles beyond the level of the maximum desired state-of-charge.

10. The method according to claim 2, wherein the step of auctioning the solar charge capacity includes soliciting bids from each of the operators of the electric vehicles within the auction group; and wherein the bids relate to a price per a unit of charge time where the energy for the charging during the unit of charge time is derived from the solar charge capacity.

11. The method according to claim 2, wherein the step of auctioning the solar charge capacity includes the steps of:

a determining an auction parameter that resolves the capacity shortage in whichever of the solar charge capacity or the charge time capacity or both;

communicating the auction parameter to and soliciting bids from each operator within the auction group;

receiving bids from the operators within the auction group; and based on the received bids, determining whether the capacity shortage is resolved, in whole or in part, in a desired manner.

12. The method according to claim 11, further comprising the steps of:

if it is determined that the received bids do not, in whole or in part, resolve the capacity shortage in a desired manner, then selecting and completing one of the following sets of procedures:

a) using the same auction parameter and the same auction group, soliciting revised bids from the auction group;

b) using the same auction group, determining a modified auction parameter and soliciting bids from the auction group pursuant to the modified auction parameter; and c) performing the auction process again using a subgroup with of the auction group, wherein the subset of the auction group comprises a sub-group whose members are determined to have submitted losing bids in the original auction process;

wherein the auction process for the subgroup includes either the same auction parameter or a modified auction parameter.

13. The method according to claim 11, further comprising the steps of:

if it is determined that the received bids resolve the capacity shortage, in whole or in part, in a desired manner, then completing the following steps:

determining, based on the received bids and the auction parameter, winning bids from the auctioning step;

based on the bid amounts, determining fees that apply to each of the electric vehicles of the winning bids for charging at the charging system;

charging the batteries of the electric vehicles of the winning bids to the desired state-of-charge; and collecting payment from the operators of the winning bids based on the determined fees.

14. The method according to claim 2, wherein the charging system further includes a grid charge capacity that is configured such that the charging system also may function to charge electric vehicles with energy drawn from the grid;

wherein a first fee comprises the fee for charging electric vehicles from the solar charge capacity, and a second fee comprises the fee for charging electric vehicles from the grid charge capacity;

wherein the first fee is less than the second fee; and wherein the step of auctioning of the solar charge capacity comprises having the operators within the auction group bid a premium above the first fee that each is willing to pay for the right to have their electric vehicle charged with energy derived from the solar charge capacity.

15. The method according to claim 14, wherein the step of auctioning the solar charge capacity comprises having the operators of the electric vehicles in the auction group bid within a fee range approximately defined by, on a low end, the first fee associated with charging the electric vehicle from the solar charge capacity, and, on a higher end, the second fee associated with charging the electric vehicle from the grid charge capacity.

16. The method according to claim 11, wherein the charging system further includes a grid charge capacity that is configured such that the charging system also may function to charge electric vehicles with energy drawn from the grid;

further comprising the steps of:

determining, based on the received bids and the auction parameter, winning bids and losing bids from the auctioning step; and for the losing bids, asking the corresponding operators whether they want their electric vehicles charged from energy drawn from the grid charge capacity.

17. The method according to claim 2, wherein the charging system includes a local storage device for storing the locally generated solar energy; and wherein calculating the solar charge capacity is based on the following: the amount of energy stored in the local storage device, solar energy currently being locally generated by the charging system, and solar energy expected to he generated by the charging system over a predetermined period of time in the near future.

18. The method according to claim 17, wherein the solar energy expected to be generated by the charging system over the predetermined period of time in the near future is calculated based on historical climate and seasonal data, current weather conditions, predicted weather conditions over the predetermined period of time in the near future, and historical solar energy generation records.

19. A system for distributing battery charge capacity to a plurality of electric vehicles, the system comprising:

means for generating solar energy locally;

means for locally storing the locally generated solar energy;

a plurality of charging stations for charging the batteries of the electric vehicles; and a computer-implemented control unit;

wherein the control unit is configured to:

group a plurality of electric vehicles into an auction group based on a predetermined criterion;

determine a requested charge for the auction group, the requested charge comprising the total energy required to charge the batteries of the electric vehicles of the auction group from a current state-of-charge to a desired state-of-charge;

calculate a requested charge time, the requested charge time comprising the total charging time required to charge the batteries of the electric vehicles of the auction group from the current state-of-charge to the desired state-of-charge;

calculate the solar charge capacity, the solar charge capacity comprising the total charging capacity of the charging system via the locally generated solar energy;

calculate a charge time capacity, the charge time capacity comprising the available charge time of the charging system;

comparing the requested charge to the solar charge capacity;

comparing the requested charge time to the charge time capacity; and when a capacity shortage is determined via a finding that the requested charge is greater than the solar charge capacity or the requested charge time is greater than the charge time capacity, auctioning the solar charge capacity to operators of the electric vehicles of the auction group.

20. The system according to claim 19, wherein the control unit is further configured such that the auctioning of the solar charge capacity includes electronically soliciting bids from each of the operators of the electric vehicles within the auction group; and wherein the bids relate to a price per unit of energy from the solar charge capacity; and wherein calculating the solar charge capacity is based on the following: the amount of energy stored in the local storage device, a current level of local solar energy generation; and an expected level of local solar energy generation over a predetermined period of time in the near future.

21. The system according to claim 19, wherein the control unit is further configured to:

determine an auction parameter that resolves the capacity shortage in whichever of the solar charge capacity or the charge time capacity or both;

electronically communicate the auction parameter to and solicit bids from each of the operators within the auction group;

electronically receive bids from the operators within the auction group; and based on the received bids, determining whether the capacity shortage is resolved, in whole or in part, in a desired manner.

22. The system according to claim. 19, further comprising, a grid connection, wherein the grid connection includes a grid charge capacity that is configured such that the charging system also functions to charge electric vehicles with energy drawn from the grid;

wherein the control unit is configured such that:

a first fee comprising the fee for charging electric vehicles from the solar charge capacity, and a second fee comprising the fee for charging electric vehicles from the grid charge capacity;

the first fee is less than the second fee; and the auctioning of the solar charge capacity comprises soliciting bids from the operators within the auction group relating to a premium above the first fee that each is willing to pay for the right to have their electric vehicle charged with energy derived from the solar charge capacity.

* * * * *